G. W. ALDRICH.
LIQUID-MEASURE.
No. 174,612. Patented March 14, 1876.
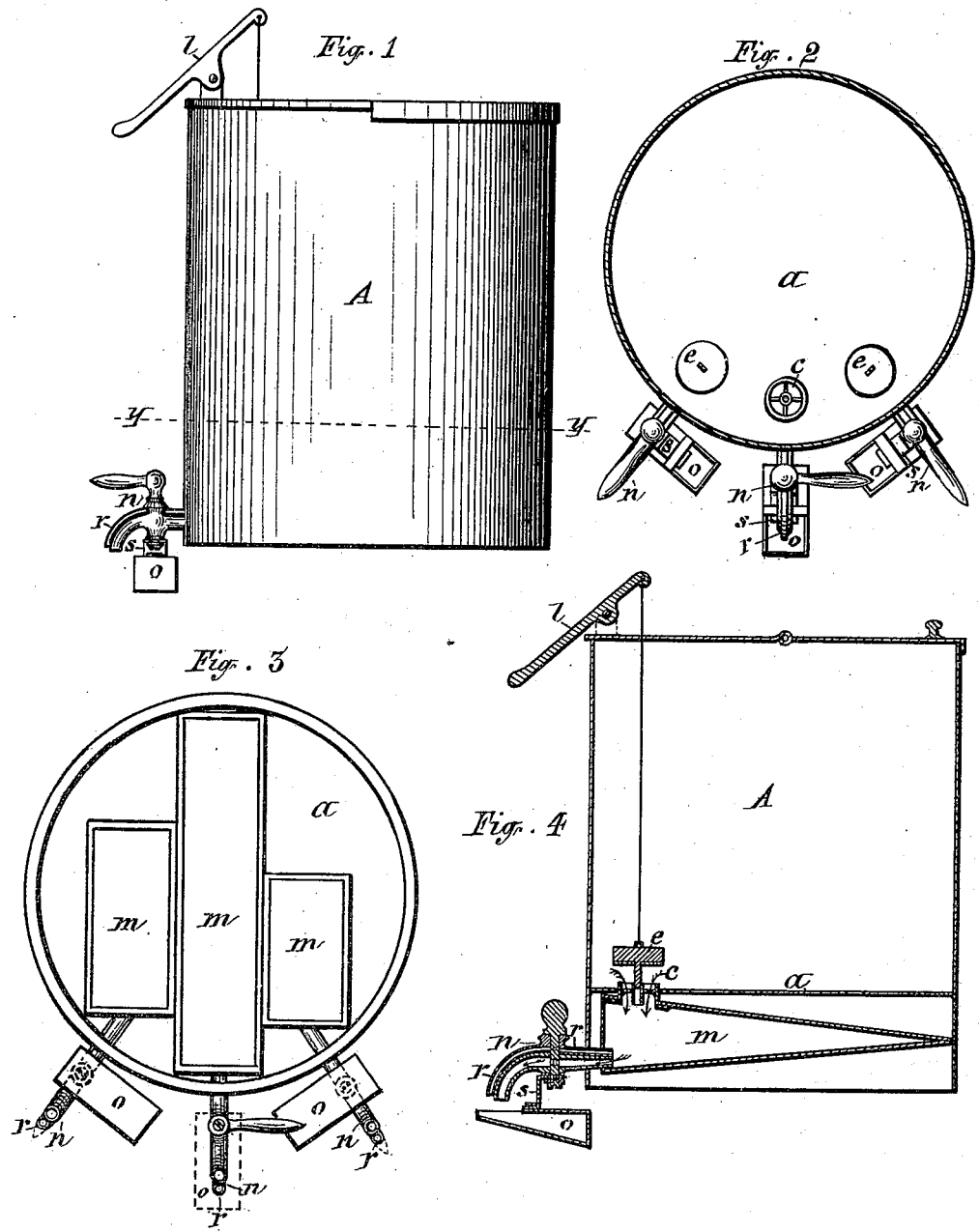
Witnesses:
Christian Holmstrup.
A. D. Behan.
Inventor:
George W. Aldrich
pr. E. Laass Atty.

UNITED STATES PATENT OFFICE.

GEORGE W. ALDRICH, OF SYRACUSE, ASSIGNOR OF THREE-FOURTHS HIS RIGHT TO ISAAC R. PHARIS, OF GEDDES, AND HERMAN LEONARD, OF SYRACUSE, NEW YORK.

IMPROVEMENT IN LIQUID-MEASURES.

Specification forming part of Letters Patent No. 174,612, dated March 14, 1876; application filed January 17, 1876.

*To all whom it may concern:*

Be it known that I, GEORGE WASHINGTON ALDRICH, of Syracuse, in the county of Onondaga, in the State of New York, have invented a new and useful Improvement in Oil-Cans, of which the following, taken in connection with the accompanying drawing, is a full, clear, and exact description:

My invention relates to improvements in liquid tanks or cans having the measures attached and the liquid drawn from them in measured quantities. These measures have been constructed in various forms, and attached to the tank in various ways and positions, but nearly all are burdened with more or less objections. In some cases they deprive the tank of a large portion of its capacity, or have their inlets so high above the bottom that a large quantity of the liquid cannot be drawn off through the faucet, and in others the construction of the measures and their combination with the tank are too complicated and expensive, and frequently unreliable and inconvenient in their operation, and most of them lack a proper, cheap, and convenient arrangement for catching the drippings from the faucet.

The object of my invention is to overcome these obstacles and inconveniences, and at the same time reduce the cost of construction. It consists, principally, in providing the tank with one or more outlets through its bottom, and attaching underneath the same one or more measures, consisting of broad shallow chambers, with their bottom descending and top ascending toward the front of the tank, where they are provided with a faucet constructed as hereinafter more fully described, and for the purpose set forth; also, in the combination, with the said outlets in the bottom of the tank, of valves operated by levers attached at the top of the tank, constructed and arranged as hereinafter specified; and also in the combination, with the faucet, of an arm or hook, constructed and attached to the spigot to change its position automatically with the turning of the spigot, and carrying on its free end a detachable cup or receptacle for the drippings, all constructed as hereinafter described.

In the drawing, Figure 1 is an exterior view of a can or tank with my improvements attached; Fig. 2, a horizontal section through line $y\ y$ in Fig. 1, showing the outlets through the bottom of the tank; Fig. 3, a view of the under side of the tank, showing the position of the measuring-chambers and faucets; and Fig. 4, a central vertical section, showing the general construction and combination of my improvements, with a tank.

A represents a tank, which may be of any size or shape, having the bottom $a$ provided with one or more outlets, $c$. The top of the latter is as near level with the bottom of the tank as possible, to obtain perfect drainage of the tank without depriving it of a suitable valve-seat. Immediately under the bottom, and opposite each of the outlets $c$, are attached the measures $m$, which, for the purpose of saving room, are made broad and shallow, and, for the purpose of facilitating thorough drainage of the measure, and at the same time obtaining depth for the attachment of the faucet, have their bottom descending and their top ascending toward the front of the tank, as fully shown in Fig. 4. $e$ is an ordinary drop-valve, provided with a downward-projecting stem, properly shaped to be braced in the outlet and guide the valve onto its seat. It is connected, by a wire or other suitable means, with a lever, $l$, pivoted on top, and operated from the outside of the tank.

$n$ represents the faucet through which the oil or other liquid is drawn from the measuring-chamber, which faucet has its discharge transversely through the spigot, and through a downward-curved extension of the faucet-barrel in front thereof. For the purpose of obtaining a free flow of the liquid, and securing a perfect drainage of the measuring-chambers, I provide the spigot with an extra passage above the liquid-passage and parallel therewith, and attach a small tube, $r$, on top of the faucet-barrel and its extension in front of the spigot, which tube is in communication with the extra passage in the spigot when the faucet is opened for drawing the liquid. This extra passage will discharge the liquid with the liquid-passage proper until the vacuum in the measuring-chamber creates atmospheric pressure sufficient to cause it to draw the air through the vent-tube $r$, thus maintaining a free flow of the liquid until the measure is emptied.

I am aware that ventiducts of various construction have been combined with faucets before now; but the peculiarity of my invention consists in the simplicity and cheapness of its construction, and its ready application to faucets designed to be attached with solder to shallow vessels, and in cases necessitating the insertion of both tubes at one point.

$s$ is a hook or arm attached to the spigot of the faucet in such a manner that in turning the spigot the said arm is turned with it, and its free end swung in or from under the end of the faucet. Upon its free end it carries a detachable cup or receptacle, $o$, for the drippings from the faucet, and the position of the arm in relation to the faucet is such that when the faucet is open the cup $o$ is removed, and, when closed, brought under the faucet to catch the drippings, as shown in Fig. 4.

The operation of my improvements is as follows: The valves $e\ e$ are kept opened and the measures filled until a certain quantity of the liquid is to be drawn, when the valve connected with the corresponding measure is closed and the faucet opened. In turning the spigot to draw the liquid the cup $o$ is carried to one side by the arm $s$, and brought into the position shown in Fig. 1, and in turning the spigot to close the faucet the cup $o$ is automatically brought under the faucet by the arm $s$, and made to stand in the position shown in Fig. 4 to catch the drippings.

Having thus fully described my invention, what I claim as new, and desire to secure by Letters Patent, is—

1. In combination with the tank A, having in its bottom the outlet $c$, provided with valve $e$, the measuring-chambers $m\ m$, having their bottom inclining and their top ascending toward the front, and provided thereat with the faucet $n$, having ventiduct $r$, constructed and arranged to operate substantially as described, for the purpose set forth.

2. The combination, with a faucet, of the arm or hook $s$, attached to the spigot, to turn automatically therewith, and carrying at its free end the detachable drip-cup $o$, all constructed to operate substantially as described, for the purpose set forth.

3. In combination with the measuring-chamber $m$, the faucet $n$, having its discharge transversely through the spigot, and through a downward-curved extension of the faucet-barrel in front of the spigot, and provided with the exterior tube $r$ on top of the faucet-barrel and its downward-curved extension aforesaid, and an extra passage transversely through the spigot, above and parallel with the liquid-passage through same, constructed substantially in the manner and for the purpose specified.

In testimony whereof I have signed my name and affixed my seal in the presence of two attesting witnesses, at Syracuse, in the county of Onondaga and State of New York, this 8th day of October, 1875.

GEORGE W. ALDRICH. [L. S.]

Witnesses:
C. HOLMSTRUP, Jr.,
A. D. BEHAN.